United States Patent [19]

Hiestand

[11] 3,771,803
[45] Nov. 13, 1973

[54] DEVICE FOR FEEDING PRESSURE FLUID FROM A STATIONARY PRESSURE SOURCE INTO A ROTATING MEMBER

[75] Inventor: Karl Hiestand, Pfullendorf, Germany

[73] Assignee: SMW-Spanneinrichtungen Schneider & Weisshaupt, Friedrichshafen, Germany

[22] Filed: Feb. 10, 1972

[21] Appl. No.: 225,093

[30] Foreign Application Priority Data
Mar. 10, 1971 Germany.................. P 21 11 355.3

[52] U.S. Cl............................ 279/4, 91/462, 92/106
[51] Int. Cl....................... B23b 31/30, F15b 13/04
[58] Field of Search.......................... 92/106; 91/462; 279/4; 285/190, 136

[56] References Cited
UNITED STATES PATENTS

| | | | |
|---|---|---|---|
| 2,230,881 | 2/1941 | Browne............................ | 285/190 X |
| 2,577,656 | 12/1951 | Hohwart et al........................ | 279/4 |
| 2,752,197 | 6/1956 | Marco.............................. | 285/190 X |
| 2,812,186 | 11/1957 | Carlsen et al........................... | 279/4 |
| 3,130,645 | 4/1964 | Hohwart............................ | 92/106 X |
| 3,417,672 | 12/1968 | Sampson.............................. | 92/106 |
| 3,545,342 | 12/1970 | Hiestand............................... | 92/106 |

Primary Examiner—Irwin C. Cohen
Attorney—Ernest F. Marmorek

[57] ABSTRACT

A non-rotatable ring is arranged within an annular recess in a circumferential portion of a rotatable cylindrical member. The facing end walls at each end of the recessed portion of the cylinder and of the ring are provided with annular slots defining pressure transmitting regions and pressure throttling zones. A pressure fluid feeding conduit is arranged within the non-rotatable ring and opens into one of the pressure transmitting regions. The opposite pressure transmitting regions are interconnected and cooperate with the throttling zones in such a manner as to cause axial vibrations of the non-rotational ring resulting in a self-adjusting pressure balance in both interspaces when the pressure fluid is applied into the feeding conduit.

13 Claims, 4 Drawing Figures

DEVICE FOR FEEDING PRESSURE FLUID FROM A STATIONARY PRESSURE SOURCE INTO A ROTATING MEMBER

REFERENCE TO RELATED APPLICATIONS

Reference is had to U.S. Pat. No. 3,545,342, issued Dec. 8, 1970 and entitled "Pressure Fluid Supply Apparatus," and to U.S. Pat. No. 3,635,481, issued Jan. 18, 1972 and entitled "Chuck for Machine Tools."

BACKGROUND OF THE INVENTION

This invention relates generally to devices controlled by a pressure fluid and more particularly it relates to a device for delivering a pressure fluid from a stationary pressure supply unit into a rotating member such as for example into a piston-cylinder hydraulic pressure device disposed within a rotating chuck body for hydraulically controlling the radially movable clamping jaws of this chuck body, or to a hydraulically controlled coupling member.

In feeding a pressure fluid from a stationary feeding conduit into a cylindrical member rotating about an axis, such as a rotatable chuck or rotatable coupling for example, there have been encountered many difficulties due to the fact that the sealing means between the stationary member and the rotating member are subject to increased friction when the pressure fluid is supplied. As a consequence, the sealing means are susceptible to increased wear or damage and a flawless delivery of the pressure fluid no longer takes place.

To prevent the abrasion of a sealing collar resting on the rotating cylinder of a pneumatically operated chuck, it has been suggested to provide a stationary coupling ring coupled to pressure air conduits and an axially displaceable sealing ring disposed in a groove between the stationary coupling ring and the face surface of the rotating chuck body; pressure air supplied from the feeding conduit urges the sealing ring against the face surface of the rotating cylinder and protects the opposite surfaces of the rotatable and non-rotatable members against abrasion.

The disadvantage of such prior art solution is in that the machining of guiding and supporting means on the stationary ring is very expensive. In addition, the stationary ring which is connected with pressure air conduits and which also supports the sealing means cannot, in many instances be suitably placed on a face surface of the rotating cylinder, namely in the case where the face surface of the rotating cylinder immediately abuts against another construction element and is therefore inaccessible. Moreover, the production of pressure fluid conduits between the cylindrical members has hitherto been very difficult.

In another known embodiment of the device for feeding pressure fluid of the aforementioned type, a ring provided with pressure fluid conduits is arranged on the outer cylinderical surface of the rotating member and is guided thereon whereby separate sealing means are assigned to each pressure fluid outlet and are disposed in a ring-shaped recess of the rotating cylinder and/or of the stationary ring. The sealing means are provided with sealing lips for guiding the pressure fluid therebetween. The outer diameter of the sealing lips is elastically deformable. In practice, this prior art embodiment has given very satisfactory results in connection with pressure air, but it is unusable for feeding pressure air from a stationary member into a rotary construction element.

Accordingly, the principal object of this invention is to avoid the aforementioned disadvantages of prior art devices of this kind.

In particular, an object of this invention is to provide a contactless connection between a stationary member and a rotating member and maintain a flawless sealing against the leaking of the pressure fluid.

Another object of this invention is to provide a device for feeding pressure fluids from a stationary pressure source into a rotating member, which has a minimum mounting space and an excellent operational reliability.

Still another object of this invention is to provide a pressure fluid feeding device of the above type which can be easily produced by simple production means.

SUMMARY OF THE INVENTION

According to this invention the above objects are attained by providing the outer circumferential portion of the rotating cylinder of the chuck body with an annular recess, and inserting a non-rotatable ring into the recess in such a manner that a certain backlash or play in the axial direction is maintained between the end surfaces of the ring and the annular recessed walls of said rotatable cylinder or chuck defining thus two opposite interspaces. The facing annular walls of the non-rotatable ring and of the radially recessed portion of the chuck or cylinder are shaped so as to form an axially recessed annular region, and flat annular surfaces acting as pressure throttling zones adjacent the recessed annular regions. The pressure fluid conduit from the non-rotatable ring opens into one recessed region and transmits the pressure fluid into a corresponding pressure fluid conduit portion disposed within the rotating part. The pressure transmitting regions in opposite interspaces are mutually connected through a passage and due to the axial play of the non-rotatable ring and due to the pressure throttling effect of the throttling zones the non-rotatable member starts vibrating in axial direction and thereby continuously adjusts the pressure balance between the respective interspaces when the pressure fluid is applied in one of the pressure transmitting regions.

In a preferred embodiment of this invention, the rotating cylinder or the chuck body is assembled from two parts which are firmly connected one to another and which are shaped in such a manner as to produce on the cylindrical surface of the rotating body an annular recess for receiving the non-rotatable ring and for defining its axial movement. The non-rotatable ring contains the pressure fluid conduits connected to a pressure source outside the device.

It is of course also possible to produce the rotating body as a single piece wherein the recess is machined on its periphery and the non-rotating ring is assembled of several mutually firmly connected pieces.

As it has been mentioned above, on each end surface of the non-rotatable ring are provided axially recessed pressure transmitting areas arranged between the pressure throttling zones; the pressure transmitting areas in respective interspaces are interconnected and the pressure fluid feeding conduit opens into one of the pressure transmitting areas. The interconnection of the respective pressure transmitting areas can be carried out either by a separate channel or through the pressure fluid feeding conduit which directly opens into one of the pressure transmitting regions and is connected with the other pressure transmitting area through a constant throttle valve in the form of a stop aperature, for instance. It will be noted that the facing plane surfaces in the throttling zone act as variable throttles.

The aforementioned two-piece assembly of the rotating cylinder has the advantage that it makes it possible to adjust arbitrarily the width of the recessed portion by inserting a spacing ring between the two parts before the final assembly of the rotating member.

It is also advantageous to create leakage fluid collecting chambers in the throttling zones. These collecting chambers are made preferably in the non-rotatable ring and have the form of annular recesses. In addition, the opposite sidewall portions of the non-rotatable ring which project above the cylindrical surface of the rotating body are equipped with sealing collars abutting against the rotating surface and protecting thus the interspaces against the penetration of cooling liquid for example.

Referring again to the connecting channel between opposite pressure transmitting regions, it is also possible to design the non-rotatable ring for backlash or play in radial direction so that no provision for additional interconnecting passages is necessary.

In the modification of the interconnection which employs constant throttle valves, it is advantageous to provide either the bottom of the annular recess, the rotating member or the inner cylindrical surface of the non-rotatable ring with an abrasion resistant coating such as for instance of molybdenum or abrasion resistant plastics, or if no constant throttle valve is employed, the interconnecting passage can be made in this abrasion resistant layer.

In using the device of this invention in connection with a hydraulically controlled chuck body, there are provided pressure fluid conduit portions for feeding as well as for return of the pressure fluid and a multiple switching valve is operatively connected between the two conduit portions to selectively control the direction of the pressure fluid.

In order to secure the non-rotatable ring against angular displacement but at the same time allow an axial movement thereof, the ring is provided with a projecting pin which engages a bifurcated member. The ring is made preferably of a self-lubricating material such as for example a sintered body soaked with oil.

To further improve the protection of lateral interspaces in the recess against leakage of pressure fluid, there are provided sealing surfaces located preferably in the area between the circumference of the non-rotatable ring and the leakage fluid collecting chambers and for sealing rings disposed in annular grooves in the sealing areas of the non-rotatable ring.

This invention makes it possible that the structure of the device for feeding pressure fluid from a non-rotatable part into a rotating part can be considerably simplified and, above all the operational reliability of the device is considerably increased. The extremely high reliability of operation results due to the fact that when the pressure fluid is applied through the feeding conduit into a recessed pressure transmitting portion between the facing end surfaces of the rotating member and of the non-rotatable ring, the pressure fluid when applied to respective throttling zones and pressure transmitting regions in opposite interspaces, causes continuous vibrations of the non-rotatable ring in its axial direction and thereby a self-adjustment of the pressure balance between the respective interspaces. In this manner there results a contactless connection between the metal surfaces of the rotating and the non-rotatable parts whereby the sealing effect therebetween is fully maintained.

The production costs of the device of this invention is very low, since the rotatable ring can be manufactured in a very simple manner for example by forming a sintered ferrous material; in addition, the arrangement of the ring in the annular recess of the rotating body requires minimum installation space. Consequently, the size of the assembled rotating part practically does not increase.

Because of the hydrostatic pressure balance attained by the axial vibrations of the non-rotatable ring, the coupling between the rotating part and non-rotating part is frictionless and nowhere abrasion can take place.

From the aforementioned brief outline of the arrangement and of advantages of the device of this invention it is apparent that the device in spite of its very simple design insures a high operational reliability.

BRIEF DESCRIPTION OF THE DRAWINGS

For a better understanding of this invention, reference is had to the following description of several embodiments of a device for feeding pressure fluid from a non-rotatable part into a rotating part according to the invention, taken in conjunction with the Figures in the accompanying drawing, in which.

DETAILED DESCRIPTION

Figure 1:
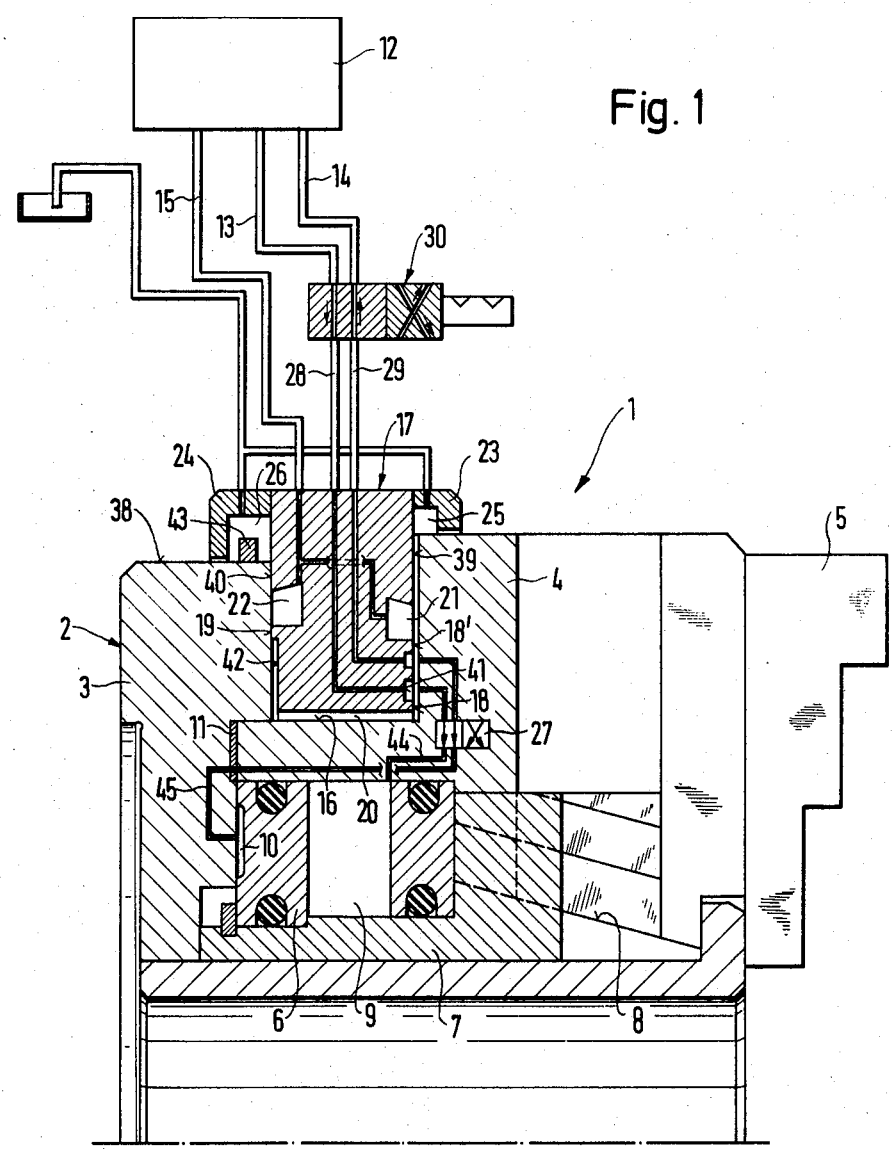
FIG. 1 is a fragmentary elevational view partly in section of a heavy duty chuck which is provided with one embodiment of a pressure fluid feeding device of this invention.

Referring now to FIG. 1, there is shown a rotatable heavy duty chuck designated by reference numeral 1 which is formed by cylindrical chuck body 2 and by clamping jaws 5 arranged for radial movement on one end face of the chuck body 2. For controlling the radial movement of the clamping jaws 5, there is provided within the chuck body 2 a pressure device including a hydraulic cylinder 9 and an axially movable piston 6 connected with an intermediate piece 7. The clamping jaws 5 are arranged in a conventional manner for clamping a working piece (not shown) which is to be machined.

To supply pressure fluid into the pressure cylinder 9 which rotates together with the chuck 1, the chuck body 2 is provided on its circumferential portion with an annular recess 16 into which a non-rotatable ring 17 is inserted with a certain axial backlash or play. The pressure fluid is supplied from a stationary hydraulic aggregate 12 through pressure fluid conduits 13, 14 into a multiple switching valve 30 and therefrom into conduit portions 28 and 29 provided within the non-rotatable ring 17 to communicate with corresponding pressure conduit portions 44 or 45 in the rotating part, as it will be explained later.

The chuck body 2 is made of two mutually fixedly connected parts 3 and 4 which when assembled form on the outer cylindrical surface portion 38 of the body 2 an annular recess 16 which is formed for receiving the non-rotatable ring 17. In addition, the interior of the chuck body 2 includes the pressure cylinder 9 in which an axially movable pressure piston 6 is acted upon by the pressure fluid from the feeding conduit 13 and is moved to the left; the other end surface of piston 6 is provided with a pressure space 10 into which the pressure fluid is applied through the pressure conduit portion 45 when the pressure conduit 13 is closed, thereby moving the piston to the right.

The movable piston 6 is connected with an intermediate movable piece 7 which is provided at its free end with inclined surfaces mating with correspondingly inclined surfaces 8 on respective clamping jaws 5. In this manner, the axial movement of the hydraulically controlled piston 6 is transformed into the radial movement of clamping jaws 5.

As it has been mentioned above, the non-rotatable ring 17 is provided with two conduit portions 28 and 29 which are alternatively supplied with pressure fluid from the hydraulic aggregate 12. In the embodiment shown in FIG. 1, the two conduit portions 28 and 29 are arranged in a spaced relation one to another and open at the same end surface of the ring 17.

To adjust the axial backlash or play of the ring 17 within the annular recess 16, a spacing ring 11 is inserted between the two parts 3 and 4 of the chuck body 2. By replacing the spacing ring 11 for another one having a different thickness, it is possible to adjust the interspaces resulting between the recessed walls of the rotating cylinder 2 and the end surfaces 39 and 40 of the non-rotatable ring 17.

According to one feature of this invention, the orifices of respective pressure fluid conduit portions 28 and 29 within the non-rotatable ring 17 open into an annular recessed region facing the orifices of corresponding conduit portions 44 and 45 within the rotating chuck body 2. These annular recesses form thus pressure transmitting regions 41 whereby the remaining surface in the interspace form pressure throttling zones 18. On the other end surface of the ring 17 there is also provided a similar pressure transmitting region 42 having however an increased surface with respect to the regions 41 on the opposite end surface; the pressure transmitting region 42 borders with a pressure throttling surface 19 formed between the wall 40 of the ring 17 and the recessed surface of the part 3. The pressure transitting surface 42 is connected with the throttling zone 18 at the opposite face of the ring 17 through an axially directed passage 20. Due to this arrangement, when the pressure fluid is applied into the pressure transmitting region 41, the resulting pressure axially displaces the ring 17 to the left and keeps closing the variable throttle 19. During this displacement, however, the other variable throttle 18 opens the axial passage 20 and the pressure growing in the pressure transmitting region 42 displaces the ring 17 to the right, thereby closing the gap between the throttling surfaces 18 which action, in turn, results in an increased pressure in the pressure transmitting region 41, etc. Due to this respecting action, the rotatable ring 17 vibrates to and fro in opposite axial directions, thereby maintaining the pressure balance between the two opposite interspaces.

According to another feature of this invention, annular pressure fluid collecting chambers 24 and 25 are provided in the sealing surfaces 39 and 40 of the nonrotating ring 17 and are connected through a leakage or return conduit 15 to the hydraulic aggregate 12.

Still another feature of this invention is the provision for collars 23 and 24 which are connected with a circumferential portion of the non-rotating ring 17 and seal the interspaces for example against the penetration of a cooling liquid, if any. The sealing collars 23 and 24 have preferably an angular configuration to provide for annular chambers 25 and 26 wherein a splash ring 43 may be located.

Figure 3:
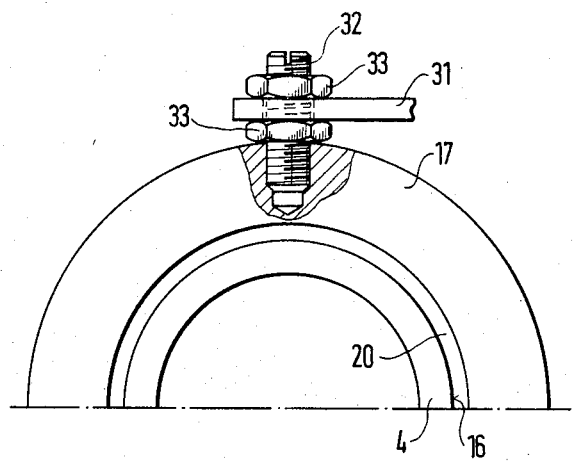
FIG. 3 is a side view, partly in section of a mounting support of the non-rotatable ring shown in connection with the chuck of FIG. 1.
Figure 4:
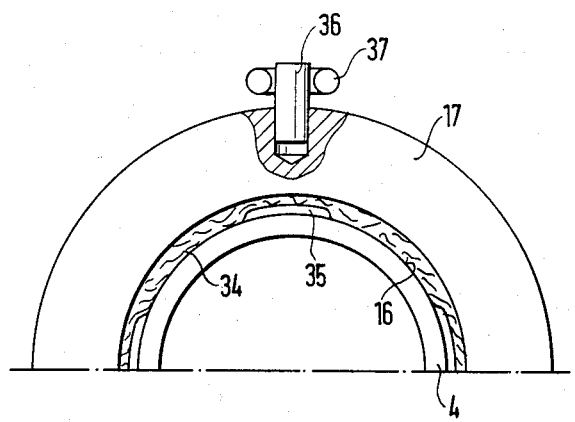
FIG. 4 is a side view, partly in section of another modification of the mounting support of FIG. 3.

Referring now to FIGS. 3 and 4 there are illustrated by way of an example two modifications of the mounting arrangement of the non-rotatable ring 17 of this invention. To insure that the ring be stationary into the direction of rotation of the chuck body but that it be movable in axial direction, a pin 36 or a bolt 32 projects from the ring 17. The bolt 32 is guided in axial direction within the slot of a fixedly mounted slotted piece 31 (FIG. 3) or gable 37 (FIG. 4). In the modification as shown in FIG. 3, the annular passage 20 connecting the pressure transmitting regions 41 and 42 and resulting due to the radial play of the ring 17 (as shown in FIG. 1), can be radially adjusted by nuts 33 which are threaded on the bolt 32 and hold the ring 17 at a predetermined radial position, thereby fixing the clearance of the slot or passage 20.

In the modification as shown in FIG. 4, pin 36 is guided between the prongs of the gable or fork 37 and the cylindrical bottom portion of the recess 16 in the rotating part is covered by an abrasion resistant cover layer 34 made, for example of molybdenum or plastic. For the interconnection of respective transmitting regions 41 and 42 there is provided within the abrasion resistant cover layer 34 a separate channel 35 through which the pressure fluid keeps the pressure balance in the respective interspaces Referring again to FIG. 1, the operation of the pressure feeding device of this invention is as follows:

When pressure fluid from the hydraulic device 12 is applied through pressure conduit 13, switching valve 30 and the pressure conduit portion 28 passing through the non-rotatable ring 17 and entering into the pressure transmitting region 41, it continues flowing through the pressure fluid conduit portion 44 and the reversing valve 27 into the pressure space of the hydraulic cylinder 9 at the right hand end of the piston 6. The applied pressure moves the piston 6 to the left as far as to the end position as indicated in FIG. 1. The intermediate piece 7 is hereby moved also to the left and the clamping jaws 5 are radially displaced to the center to clamp a workpiece (not shown). When the reversing valve 27 is switched over, the pressure fluid from the conduit portion 44 is fed through the conduit portion 45 into the pressure space 10 at the left hand end surface of the piston 6 and the piston 6 moves to the right whereby the radial movement of clamping jaws 5 is reversed.

In spite of the fact that no sealing means are provided between the chuck body 2 and the non-rotating ring 17 within the recess 16, there results a hydrodynamic sealing effect between the facing end surfaces of the chuck body and of the ring 17. Upon admission of the pressure fluid into the pressure transmitting region 41 the ring 17 is moved to the left so that the throttling zone 19 is almost closed. In this position, a minute amount of the pressure fluid enters the collecting chamber 21; nevertheless since the throttling zone 18 is open, the pressure fluid acts also in the pressure transmitting region 42 and keeps moving the piston 6 to the right so long until the pressure acting upon the transmitting region 42 is in balance with the pressure acting in the pressure transmitting region 41. The pressure region 42 which is located opposite to the pressure region 41 into which the pressure fluid conduits are opening, have preferably a larger area than that of the region 41.

Due to this self-adjusting pressure relief and pressure increase, the ring 17 maintains automatically continuous vibrations whereby through the alternating variations of the throttling zones 18 and 19 the pressure fluid is more or less throttled and consequently the pressure forces are kept in dynamic balance. For this reason, no contact of the end walls of the ring 17 with the end walls of the recessed end wall portions 29 and 40 of the chuck body 2 takes place and accordingly no metallic friction occurs. Moreover, the continuously alternating pressure increases and pressure decreases guarantee minimum axial displacement of the ring 17. Should the facing end walls in an interspace abut against each other, the pressure in the assigned pressure transmitting region would increase to such a degree that the ring 17 would become instantaneously disengaged from such a contact. It is evident that in this manner the flawless sealing action between the rotating chuck body 2 and the non-rotatable ring 17 is fully insured. The throttling zone 18' located between the return conduit portion 29 and the leakage fluid collecting chamber 21 cooperates with leakage fluid collecting chamber 21 which is located in the remaining peripheral surface portion 39 of the ring 17. Due to the effect of the so-called thermical wedge which results in sealing the interspaces between the end surfaces of the ring 17 and the end surfaces of the recessed chuck body portion, further leakage of the pressure fluid in outward direction is effectively prevented.

In order to release the clamping pressure of the jaws 5 against the workpiece during the standstill of the chuck 1, the multiple switching valve 30 which is located outside the rotating parts, makes it possible to change the direction of flow of the pressure fluid from the conduit portion 28 to the conduit portion 29 and vice versa. When pressure fluid is applied to the conduit portion 29, the non-rotatable ring 17 is displaced to the left in the same manner as it has been described above with reference to the pressure conduit 28. The throttling zone 19 almost closes the left hand interspace when the pressure fluid flows both through the conduit portion 45 into the pressure space 10 and through the axial passage 20 into the pressure transmitting region 42. The leaking fluid is again collected in collecting chambers 22 and 21 and returned to the hydraulic aggregate 12. Thus, in general, as more pressure fluid is fed into the hydraulically controlled chuck 1 than can leak through the throttling surface 18', the leakage fluid loss, even during the standstill of the non-rotatable part, is significant.

Figure 2:
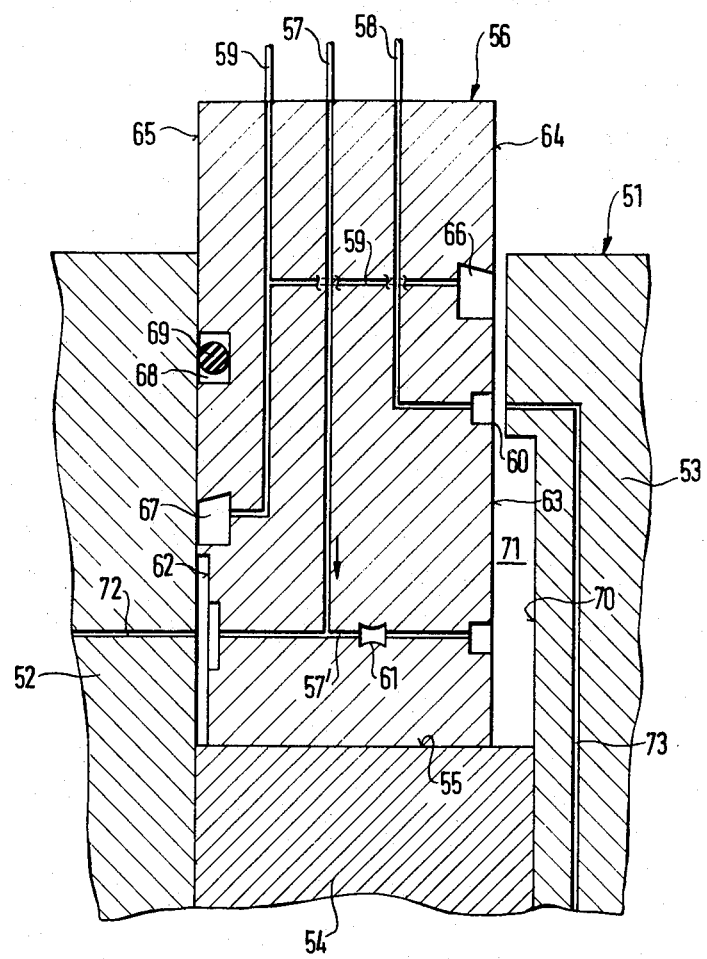
FIG. 2 is a sectional elevational view of another modification of the pressure fluid feeding device of this invention.

In the embodiment of the pressure fluid feeding device of this invention, as illustrated in FIG. 2, the cylinder 51 is assembled of three firmly connected parts 52, 53 and 54, which form again an annular recess 55 for receiving ring 56 which is provided with pressure fluid conduit portions 57 and 58 as well as with pressure fluid collecting chambers 66 and 67 and leakage fluid return conduit portion 59. Similarly as in the previously described embodiment of FIG. 1, there are provided pressure transmitting regions 62 and 63 having different surface areas. The pressure transmtting region is provided on the end surface 65 of the ring 56 whereas the pressure region 63 is defined by a recess 70 provided in a recessed wall of the part 53. In this particular embodiment, no separate inter-connecting channel or passage is provided between respective pressure transmitting regions. Instead, the pressure fluid conduit 57 which opens into the region 62 is provided with a branch conduit 57' which opens through a constant throttle 61 into the pressure region 63. The interspace area 60 adjacent the pressure region 63 acts thereby as a variable pressure throttling zone. In addition there are provided in the ring 56 leakage oil collecting chambers 66 and 67 as well as a groove 68 for receiving the sealing ring 69.

The operation of the embodiment of FIG. 2 is as follows:

As soon as the pressure fluid is applied through the feed conduit 57 to the pressure region 62 and further forwarded through channels 72 in the rotating cylindrical part 52, the high pressure of the pressure fluid in the region 62 axially displaces the ring 56 to the right and the pressure throttling zone 60 continues closing. Through the conduit branch 57' and the constant throttle 61 the pressure fluid is supplied into the pressure region 63 which is larger than the pressure region 62. In spite of the fact that due to the effect of the fixed throttle 61 only a reduced amount of the pressure liquid is delivered into the region 63, the pressure in this region 63 increases proportionally to the closing of the throttle zone 60. Because of the larger area of the pressure region 63 in comparison with region 62, the ring will move to the left so far until a pressure balance is established between the two pressure regions. In this manner a contact of the ring 56 against the parts 52 and 53 is reliably avoided. The pressure relief conduit 58 is provided in the ring 56 and opens into an annular recess opposite to pressure relief portion 73 in the rotating part 53.

I wish it to be understood that I do not desire to be limited to the exact details of construction shown and described, for obvious modifications will occur to a person skilled in the art.

Having thus described the invention what I claim as new and desire to be secured by Letters Patent is as follows:

1. A device for feeding a pressure fluid from a stationary pressure source into a rotatable member including a pressure fluid actuated device controlled by said pressure fluid, comprising, an annular recess defining opposite radial end surfaces and an endless bottom wall in a circumferential portion of said rotatable member and being concentric with the axis of rotation thereof, a single non-rotatable annular member disposed within said recess defining opposite radial faces each facing an end surface, and having an axial play producing opposite interspaces one between each face and the end surface of said members, said end faces in each interspace having a pressure transmitting annular recessed region and a pressure throttling zone formed by a face portion surrounding said region,
a first pressure fluid conduit portion connected to said source and disposed within said non-rotatable annular member and opening into one region,
a second pressure fluid conduit portion connected to said pressure fluid actuated device and disposed in said rotatable member and opening into said one region near said first conduit portion,
said one region being interconnected by passage means with the opposite region, one of said regions having a larger area than the other region, whereby said zones produce a self-adjustable pressure balance between said interspaces by axially reciprocating said non-rotatable member when said pressure fluid is fed through said first conduit portion into said one pressure fluid transmitting region.

2. A device according to claim 1, wherein said rotatable member is a chuck body with radially movable jaws and said pressure fluid actuated device is a hydraulic piston axially movable in said rotatable member and operable for controlling the jaws of said chuck body.

3. A device according to claim 1, further comprising annular chambers defined in said non-rotatable member and respectively opening into said zones for collecting leakage fluid emanating from said regions.

4. A device according to claim 3, further comprising sealing means located in at least one of said interspaces between the circumference of said rotatable member and said leakage fluid collecting chambers.

5. A device according to claim 1 wherein said first conduit portion includes a branch connected to said opposite region and comprising a constant throttle, whereby said zones operate as variable throttles.

6. A device according to claim 1 wherein said non-rotatable annular member is made of a selflubricating material.

7. A device according to claim 2 further including additional conduit portions for selectively controlling the movement of said hydraulic piston, and additional pressure transmitting regions and pressure throttling zones assigned to said additional conduit portions.

8. A device according to claim 2 wherein said chuck body is assembled of two parts defining said annular recess and said hydraulic cylinder, said two parts being connected to each other through exchangeable spacer means designed for adjusting the axial play of said non-rotatable member.

9. A device according to claim 2, further comprising means for holding said annular member in a non-rotatable position and for allowing axial displacement of said annular member.

10. A device according to claim 2 wherein said non-rotatable annular member has a larger diameter than said recess thereby extending beyond the confines of said rotatable member, at least one of the extending end wall portions of said non-rotatable member being provided with a sealing collar abutting against said chuck body for sealing the interspaces against the entry of any cooling liquid.

11. A device according to claim 3 further comprising a reversing valve associated with said second conduit portions in said rotatable member for controlling the flow of said pressure fluid into said pressure device.

12. A device according to claim 1 wherein said non-rotatable member has a play in radial direction as against said rotatable member defining said passage means between its cylindrical wall and the cylindrical bottom of said recess.

13. A device according to claim 12 wherein the bottom wall of said recess is provided with an abrasion-resistant cover layer.

* * * * *